US008401952B1

(12) United States Patent
Foygel et al.

(10) Patent No.: US 8,401,952 B1
(45) Date of Patent: Mar. 19, 2013

(54) TRADE ORDER SUBMISSION FOR ELECTRONIC TRADING

(75) Inventors: Alexander V. Foygel, Highland Park, IL (US); Bharat Mittal, Schaumburg, IL (US)

(73) Assignee: Trading Technologies International, Inc., Chicago, IL (US)

( * ) Notice: Subject to any disclaimer, the term of this patent is extended or adjusted under 35 U.S.C. 154(b) by 515 days.

(21) Appl. No.: 12/410,232

(22) Filed: Mar. 24, 2009

(51) Int. Cl.
*G06Q 40/00* (2012.01)
(52) U.S. Cl. .......................................... 705/37
(58) Field of Classification Search .................. None
See application file for complete search history.

(56) References Cited

U.S. PATENT DOCUMENTS

| | | | | |
|---|---|---|---|---|
| 6,035,287 | A * | 3/2000 | Stallaert et al. .............. | 705/37 |
| 7,437,325 | B2 | 10/2008 | Kemp, II et al. | |
| 7,613,647 | B1 * | 11/2009 | Cushing et al. .............. | 705/37 |
| 7,680,722 | B2 * | 3/2010 | Bok et al. ..................... | 705/37 |
| 7,693,775 | B2 * | 4/2010 | Korhammer et al. ......... | 705/37 |
| 7,761,365 | B2 * | 7/2010 | Kessler et al. ............... | 705/37 |
| 7,865,423 | B2 * | 1/2011 | Hughes et al. ............... | 705/37 |
| 2003/0233306 | A1 * | 12/2003 | Madhavan et al. ........... | 705/37 |
| 2006/0256796 | A1 * | 11/2006 | Agarwala et al. ......... | 370/395.7 |
| 2007/0124230 | A1 * | 5/2007 | Sofianos ..................... | 705/37 |
| 2007/0180158 | A1 * | 8/2007 | Irish et al. ................... | 710/5 |
| 2007/0192208 | A1 * | 8/2007 | Takeo et al. ................. | 705/26 |
| 2008/0168260 | A1 * | 7/2008 | Zyuban et al. ............... | 712/214 |

OTHER PUBLICATIONS

Arulambalam, Ambalavanar; Explicit Congestion Control Algorithms for Available Bit Rate Services in Asynchronous Transfer Mode Networks; A Dissertation—New Jersey Institute of Technology, Department of Electrical and Computer Engineering (May 1996).*
Cain, Harold W, III; Detecting and Exploiting Causal Relationships in Hardware Shared-Memory Multiprocessors; A Dissertation—University of Wisconsin—Madison (Nov. 2004).*
Torzhkov, Andrey; Essays on Modeling and Managing Congested Systems with Customers Sensitive to Past Delays; A Dissertation—New York University, Department of Operations Management (Oct. 2008).*

* cited by examiner

*Primary Examiner* — Virpi Kanervo
(74) *Attorney, Agent, or Firm* — McDonnell Boehnen Hulbert & Berghoff LLP

(57) ABSTRACT

Various systems and methods for trade order processing in an electronic trading environment are provided. The order processing includes initiating a first thread of instructions at a computing device to send a first trade order onto an electronic exchange. However, if one or more trade orders are identified during the process to send the first trade order, then the one or more orders are queued. When the first trade order is sent to the electronic exchange, then a second thread of instructions is initiated at the computing device to send the queued one or more trade orders (substantially together, if there is more than one) on to the electronic exchange.

18 Claims, 4 Drawing Sheets

TRADE ORDER SUBMISSION FOR ELECTRONIC TRADING

BACKGROUND

The present invention is directed towards electronic trading. More particularly, embodiments of the present invention are directed towards trade order submission.

An electronic trading system provides for electronically matching orders to buy and sell items to be traded. The items may include, for example, stocks, options, and commodities. Typically, an electronic exchange in the electronic trading system is used to match the orders. In addition, the electronic exchange provides market data to various client devices in the electronic trading system used by traders to place the orders. For example, the electronic exchange may provide market data such as prices for various items available for trading and trade confirmations indicating what trades have occurred at what quantities and/or prices. An example of an electronic exchange is the CME® Globex® electronic trading platform, which is offered by the Chicago Mercantile Exchange (CME).

Oftentimes, the matching algorithm at the electronic exchange gives some level of priority to the first person to place an order. As such, trade order submission by a particular computing device on behalf of a trader can play a crucial part in electronic trading.

SUMMARY

Various embodiments that are described herein include systems and methods for trade order processing in an electronic trading environment. According to one or more embodiments, a first thread of instructions is initiated at a computing device to send a first trade order to an electronic exchange. One or more trade orders to be sent to the electronic exchange is identified subsequent to initiating the first thread of instructions. The one or more trade orders are queued at the computing device prior to sending the plurality of trade orders to the electronic exchange. Initiating a second thread of instructions at the computing device to send the one or more trade orders substantially together to the electronic exchange subsequent to identifying the first order is sent. Flag bits may also be set and used to identify when orders are in the process of being sent and when orders are queued.

BRIEF DESCRIPTION OF THE DRAWINGS

Example embodiments are described herein with reference to the following drawings.

Figure 1:
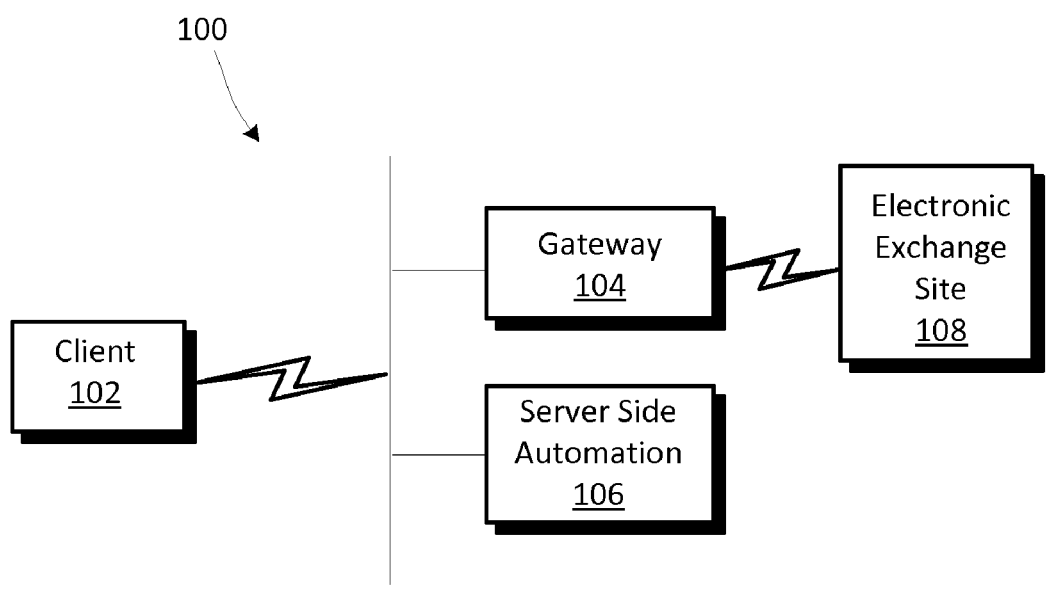
FIG. 1 illustrates an example electronic trading system in which certain embodiments may be employed.

The foregoing will be better understood when read in conjunction with the drawings which show various embodiments. The drawings are for the purpose of illustrating certain embodiments, but it is understood that the present invention is not limited to the arrangements and instrumentality shown in the drawings.

DETAILED DESCRIPTION

Various systems and methods are described herein for trade order processing. The order processing includes initiating a first thread of instructions at a computing device to send a first trade order to an electronic exchange. However, if one or more trade orders are identified during the process to send the first trade order, then the one or more orders are queued. When the first trade order is sent to the electronic exchange, then a second thread of instructions is initiated at the computing device to send the one or more trade orders (substantially together, if there is more than one) on to the electronic exchange.

FIG. 1 illustrates an example electronic trading system 100 in which certain embodiments may be employed. The system 100 includes client device 102, gateway device 104, server side automation device ("SSA") 106, and electronic exchange 108. According to this example, client device 102 is in communication with gateway 104. Gateway 104 is in communication with electronic exchange 108. SSA 106 may be in communication with client device 102 and gateway 104.

According to some operations, client device 102 may be utilized to send orders to buy or sell tradeable objects (e.g., trade orders) listed at exchange 108. Orders to be placed at exchange 108 via client device 102 are sent through gateway 104. In addition, market data may be sent from exchange 108 through gateway 104 to client device 102. The user may utilize client device 102 to monitor the market data and base decisions to send an order for a tradeable object. Trading decisions at client device 102 may be manual or automated.

According to some operations, SSA 106 may be utilized to send orders to buy or sell tradeable objects at exchange 108 on behalf of the user of client device 102. Orders to be placed at exchange 108 via SSA 106 are sent through gateway 104. Market data may be sent from exchange 108 through gateway 104 to SSA 106. SSA 106 may monitor the market data and base decisions to send an order for a tradeable object. Trading decisions at SSA 106 are generally automated, but it may be possible for manual intervention by a user of client device 102, if it is so programmed.

Client device 102 may include one or more electronic computing devices such as a hand-held device, laptop, personal computer, workstation with a single or multi-core processor, server with multiple processors, and/or cluster of computers, for example. A present day commercial example might include a computing device that utilizes the Windows XP Professional operating system and has at least 2 GB of memory, two dual-core or two quad-core processors, a network card, and at least 10 GB of hard drive space to accommodate software.

Client device 102 may also be configured to run one or more trading applications. The trading application(s) may, for example, process market data by arranging and displaying the market data in trading and charting windows. This processing may be based on user preferences, for example. In addition to manual style trading tools, the trading application(s) may include an automated trading tool such as an automated spread trading tool, for example. In another example, client device 102 may be a computing system running a copy of X_TRADER™, an electronic trading platform provided by Trading Technologies International, Inc. of Chicago, Ill. Regardless of the type of trading application, client device 102 may be configured to send orders to buy and sell tradeable objects listed at exchange 108. Client device 102 may also be configured to cancel orders, change orders, and/or query exchange 108, for example. Client device 102, including the one or more trading applications, may also be configured to operate with one or more trading application at SSA 106, more of which is described below.

Orders sent by client device 102 may be sent at the request from a user manually or automatically, for example. For example, a trader may utilize an electronic trading workstation to place an order for a particular tradeable object, manually providing various parameters for the order such as an order price and/or quantity. In another example, an automated trading tool may calculate one or more parameters for an order and automatically send the order.

In certain embodiments, client device 102 includes a user interface. The user interface may include one or more display devices for presenting a text-based or graphical interface to a user, for example. For example, the display devices may include computer monitors, hand-held device displays, projectors, and/or televisions. The user interface may be used by the user to specify or review parameters for an order. The user interface may include one or more input devices for receiving input from a user, for example. For example, the input devices may include a keyboard, trackball, two or three-button mouse, and/or touch screen. The user interface may include other devices for interacting with a user. For example, information may be aurally provided to a user through a speaker and/or received through a microphone.

In certain embodiments, orders from client device 102 are sent on to exchange 108 through gateway 104. Client device 102 may communicate with gateway 104 using a local area network, a wide area network, a virtual private network, a T1 line, a T3 line, a point-of-presence, and/or the Internet, for example.

Server side automation ("SSA") 106 may include one or more electronic computing platforms such as a personal computer, workstation with a single or multi-core processor, server with multiple processors, and/or cluster of computers, for example. A present day commercial example might include a computing device that utilizes the Windows 2003 Server (Server Pack 2) operating system and has at least 4 GB of memory, two dual-core or two quad-core processors, one or more network cards, and at least 30 GB of hard drive space to accommodate software.

In certain embodiments, SSA 106 is used to implement automated or semi-automated trading programs. Orders may be sent directly from SSA 106 to exchange 108 through gateway 104. Orders may also be sent from another computing device to exchange 108 via instructions from SSA, for example. In certain embodiments, SSA 106 is configured to implement an automated or semi-automated trading program on behalf of a user of client device 102. An example trading application that may run on SSA 106 is an automated spread trading tool like that disclosed in U.S. Pat. No. 7,437,325, the contents of which are incorporated herein by reference. The commercial embodiment of an automated spread trading tool is Autospreader®, which is offered by Trading Technologies International. The Autospreader® can be configured to operate at client device 102, SSA 106, or both client device 102 and SSA 106, for example.

In certain embodiments, SSA 106 is physically located at the same site as client device 102. In certain embodiments, SSA 106 is physically located at the same site as exchange 108. In certain embodiments, SSA 106 is collocated with gateway 104. In certain embodiments, SSA 106 is physically located at a site separate from both the client device 102 and the exchange 108. In certain embodiments, regardless of its location, client device 102 and SSA 106 may be considered part of the "client side" of system 100, because SSA 106 may be operating on behalf of a user at client device 102, for example.

Gateway 104 may include one or more electronic computing platforms such as a personal computer, workstation with a single or multi-core processor, server with multiple processors, and/or cluster of computers, for example. In certain embodiments, gateway 104 is physically located at the same site as the client device 102. In certain embodiments, gateway 104 is physically located at the same site as exchange 108. In certain embodiments, gateway 104 is with collocated with SSA 106. In certain embodiments, gateway 104 is physically located at a site separate from both the client device 102 and the exchange 108.

In certain embodiments, gateway 104 communicates with client device 102 and/or SSA 106 using a local area network, a wide area network, a virtual private network, a T1 line, a T3 line, a point-of-presence, and/or the Internet, for example.

Gateway 104 is adapted to communicate with client device 102 and exchange 108. Gateway 104 facilitates communication between client device 102 and/or SSA 106 and exchange 108. For example, gateway 104 may receive orders from client device 102 and/or SSA 106 and transmit the orders to exchange 108. As another example, gateway 104 may receive market data from exchange 108 and transmit the market data to client device 102 and/or SSA 106. Gateway 104 may be used to implement certain embodiments of the present invention.

In certain embodiments, gateway 104 performs processing on data communicated between client device 102 and/or SSA 106 and exchange 108. For example, gateway 104 may process an order received from client device 102 and/or SSA 106 into a data format acceptable by exchange 108. Similarly, gateway 104 may transform market data in an exchange-specific format received from exchange 108 into a format understood by client device 102 and/or SSA 106. The processing of gateway 104 may also include tracking orders from client device 102 and/or SSA 106 and updating the status of the order based on fill confirmations received from exchange 108, for example. As another example, gateway 104 may coalesce market data from exchange 108 and provide it to client device 102 and/or SSA 106.

Exchange 108 is configured to match orders to buy and sell tradeable objects. The tradeable objects may be listed for trading at exchange 108. The orders may include orders received from the client device 102, SSA 106, or both, for example. Orders may be received from client device 102, SSA 106, or both through gateway 104, for example. In addition, the orders may be received from other devices in communication with exchange 108. That is, typically exchange 108 will be in communication with a variety of other client devices (which may be similar to client device 102) or other computing devices that also provide orders to be matched. As previously discussed, an example of exchange 108 is the CME®, headquartered in Chicago, Ill.

Exchange 108 is configured to provide market data. The market data may be provided to the client device 102, for example. The market data may be provided to client device 102, SSA 106, or both through gateway 104, for example. The market data may include data that represents the inside market, for example. The inside market is the lowest sell price (also referred to as the "best ask") and the highest buy price (also referred to as the "best bid") at a particular point in time. The market data may also include market depth. Market depth refers to the quantities available at other prices away from the inside market. In certain embodiments, market depth is provided for all price levels. In certain embodiments, market depth is provided for less than all price levels. For example, market depth may be provided only for the first five price levels on either side of the inside market. The market data may also include information such as the last traded price (LTP), the last traded quantity (LTQ), and order fill information.

In certain embodiments, system 100 includes more than one client device 102. For example, multiple client devices similar to the client device 102, discussed above, may be in communication with gateway 104 and/or SSA 106 to send orders to the exchange 108. Similarly, in certain embodiments, system 100 includes more than one SSA 106.

In certain embodiments, system 100 includes more than one gateway 104. For example, multiple gateways similar to the gateway 104, discussed above, may be in communication with the client device 102 and/or SSA 106 and the exchange 104. Such an arrangement may be used to provide redundancy should gateway 104 fail, for example. System 100 might also include additional gateways to facilitate communication between client device 102 and/or SSA 106 and other exchanges besides exchange 108.

In certain embodiments, system 100 includes more than one exchange 108. For example, the gateway 104 may be in communication with multiple exchanges similar to the exchange 108, discussed above. Such an arrangement may allow client device 102 and/or SSA 106 to trade at more than one exchange through gateway 104, for example.

In certain embodiments, gateway 104 is part of client device 102 and/or SSA 106. For example, the hardware/software components of gateway 104 may be part of the same computing platform as the client device 102 and/or SSA 106. As another example, the functionality of gateway 104 may be performed by components of the client device 102 and/or SSA 106. In certain embodiments, gateway 104 is not present. Such an arrangement may occur when the client device 102 and/or SSA 106 does not need to utilize gateway 104 to communicate with exchange 108, for example. For example, if client device 102 and/or SSA 106 have been adapted to communicate directly with exchange 108.

While not shown for the sake of clarity, in certain embodiments, system 100 may include other devices that are specific to the communications architecture such as middleware, firewalls, hubs, switches, routers, exchange-specific communication equipment, modems, security managers, and/or encryption/decryption devices.

Figure 2:
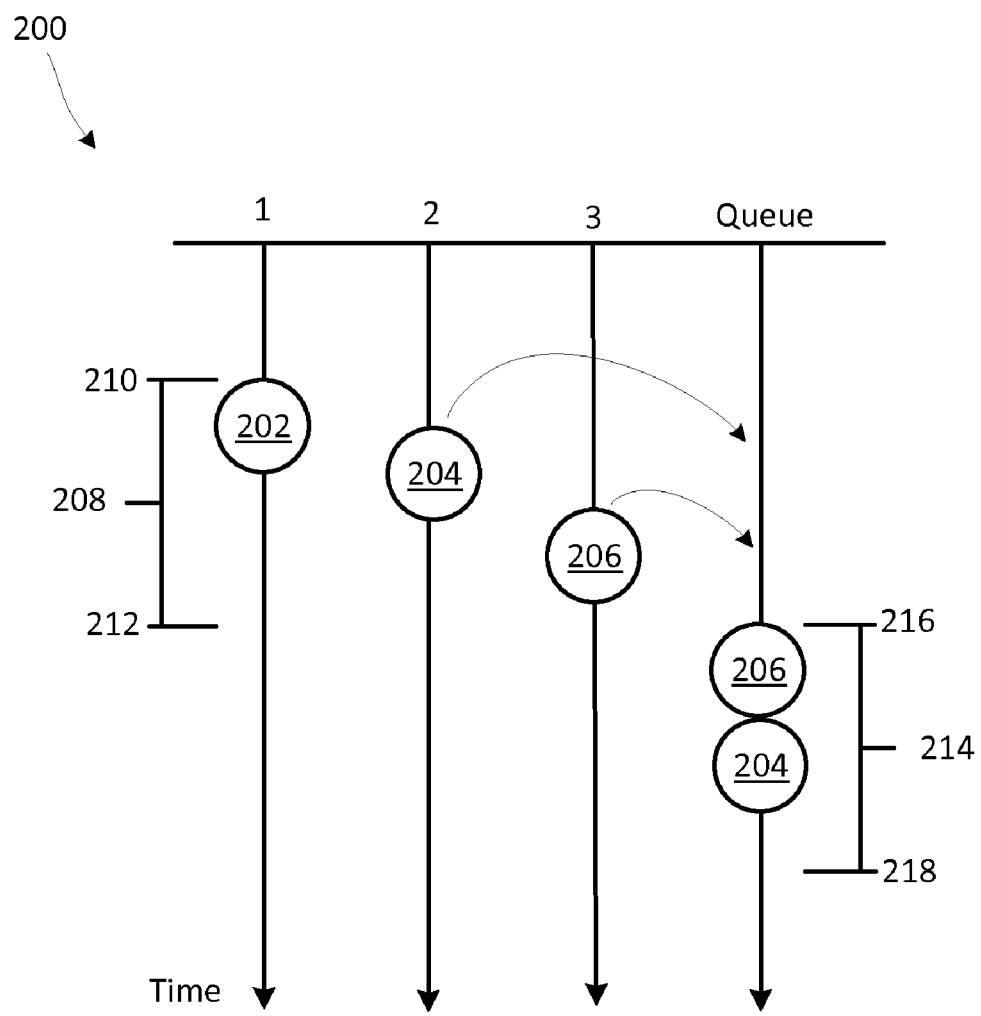
FIG. 2 is a diagram showing a sequence of events according to certain embodiments.

FIG. 2 is a diagram showing a sequence of events according to example embodiments. Particularly, the diagram illustrates four computer related threads, which include three similar operating threads (1, 2, and 3) and a queuing thread. Each of the threads executes instructions to carry out an operation. For example, the first, second, and third threads represent instructions to send an order to the electronic exchange. The first through third threads may also execute instructions to generate an order, such as by a trading application running on a particular thread, for example. Generating an order might include generating an order price and/or an order quantity, among other things. The queuing thread represents a set of instructions that empties the orders in the queue by sending the one or more queued orders to the electronic exchange. In certain embodiments, each thread corresponds to a dedicated processor, though having a dedicated processor run each thread is not necessary. It is also understood that there could be more or less threads than that shown in the diagram.

According to FIG. 2, order 202 is ready to be sent to the electronic exchange. The time it takes to send the trade order is represented by the brackets at 208. This "time to send" represents the time it takes to place the order message on the actual data channel to the exchange (and/or gateway). In a present day example, it might take 100 microseconds or less to place the order message on the actual data channel, though it could take more or less time depending on the computing system. Regardless of the amount of time it takes to send the order, the process of sending the order starts at a time indicated by 210 and ends at a time indicated by 212.

According to FIG. 2, no other order was ready to be sent at 210. As such, the system initiated the process to send order 202 at a time referenced at 210. During the time to send order 202, another order represented by order 204 was ready to be sent. In other words, after the process to send order 202 was initiated (and before order 202 was sent at 212), order 204 was generated and ready to be sent to the electronic exchange. As a result of order 202 being in the process to send, order 204 is moved to the queuing thread.

Also according to FIG. 2, another order represented by order 206 was ready to be sent. In other words, order 206 is ready to be sent to the electronic exchange. However, as a result of order 204 being in the process to send, order 206 is moved to the queuing thread. In certain embodiments, order 204 and order 206 are collected into a batch, such that when the time is ready to send an order that is different than order 202, the two orders (order 204 and order 206) can be sent together to the electronic exchange. In other words, the two orders are sent via a single message on to the electronic exchange via gateway 106 which may improve the efficiency. In certain embodiments, the two orders are sent substantially simultaneously on to the electronic exchange via gateway 106.

Looking at FIG. 2, once order 202 is sent to the electronic exchange (e.g., the process of placing the order message onto the channel is complete), which is represented at time 212, then the process of sending orders 204 and 206 can be initiated. The time it takes to send trade orders 204 and 206 is represented by the bracket at 214. The process of sending the orders starts at a time indicated by 216 and ends at a time indicated by 218. Time to send the batched orders may be similar to the time it takes to send a single order (e.g., 100 microseconds or less, such as described above), though it could take more or less time.

As described above, in certain embodiments the queued orders are collected on the order queue into a batch. There may be limits on how many order messages can be collected into a single batch. For example, "30" order messages might be collected into a single batch, though more or less could be collected into a batch. If there are more queued orders than can fit in a single batch, then another batch is collected, and so on until the queue is empty. However, looking to the example in FIG. 2, there are only two orders ready to be sent to the exchange and both orders can be sent after time 212. As such, there is no need to wait for more orders to be queued to meet the order limits of a batch.

Figure 3:
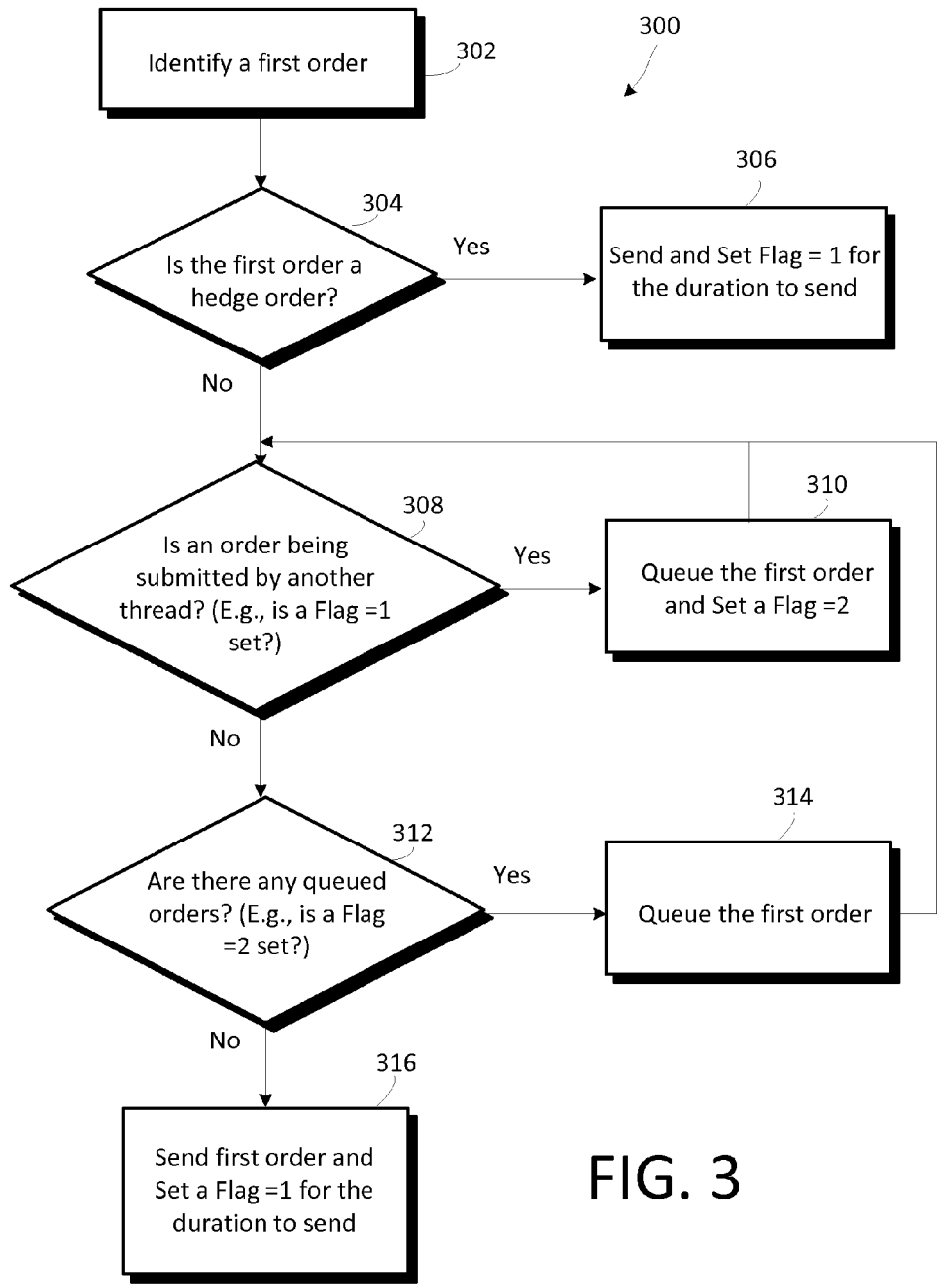
FIG. 3 illustrates a flowchart of a process for sending an order according to certain embodiments.

FIG. 3 illustrates a flowchart 300 of a process for sending an order according to certain embodiments.

At block 302, an order is identified. For ease of explanation, this order is referred to as a "first order." Looking back to FIG. 2, order 202 may be considered the "first order," for example, in the context of the example in that figure. In some embodiments, the first order may be generated according to a trading strategy, for example, on the same thread that the order is sent. In other embodiments, the first order may be generated according to a trading strategy on a different thread at the same computing device. In other embodiments, the first order may be generated according to a trading strategy at a different computing device. Regardless of where the order is generated, the order is identified per block 302.

At block 304, the system determines whether the first order is a hedge order. While this block may be removed from the flowchart without affecting the later blocks, it provides an option to send those orders that have a certain level of importance to be quickly sent to the exchange, without the risk of being queued. A hedge order is an order that might possess a higher level of importance, and therefore the system could be programmed per block 304 to send the order to the exchange as soon as possible. The designated level of importance could be a user-selected option or hardcoded into the system, for example.

At block 306, if the order is a hedge order, or an order that meets the designated level of importance, then the process to send the order is initiated immediately, if there are no other orders in the process of being sent, or at the next available time. So, for example, if order 204 in FIG. 2 was a hedge order, then instead of being queued as shown in the figure, the process for sending the order 204 would start when order 202 was sent (e.g., around the time indicated by 212), which represents the next available time. If the order is sent, then a first flag bit may be set to "1" to indicate that an order is in the process of being sent.

At block 308, if the first order is not a hedge order, or an order that meets the designated level of importance, then the system determines whether another order is being sent. In the example shown in FIG. 2, order 202 is in the process of being sent during 210 and 212, because no other order was being sent at, or approximate, to the time represented by 210. However, thread 2 cannot begin to send order 204, because order 202 is already in the process of being placed on the channel. If an order is in the process of being sent, then the first flag bit may be set to "1" to indicate that an order is in the process of being sent. Then, for example, the flag bit may be set to "1" for the duration between 210 and 212. During that time, threads 2 and 3 cannot begin the process to send orders 204 and 206.

At block 310, if another order is in the process of being sent, or equivalently the first flag bit is set to "1," then the order is queued in a data structure in the system. Looking again to FIG. 2, orders 204 and 206 are queued in a data structure, because order 202 is in the process of being sent to the exchange.

At block 312, if there are other queued orders, then the order is queued in a data structure in the system. If an order is queued, then a second flag bit may be set to "2" (the second flag bit could also be set to "1," for example, given that the second flag bit is referring to a different flag bit than the first flag bit, but the second flag bit is set to "2" in these examples for ease of illustrating the various possible flag bits). Using the example shown in FIG. 2, when order 204 is identified in the order queue, then the second flag bit would be set to "2," indicating that an order is queued.

At block 316, if there are no queued orders, then the thread that identified the first order can initiate instructions to send the order. For example, order 202 is in the process of being sent and a flag bit was set to "1" for the duration of the time to send. The flag bit is reset to "0," for example, when order 202 is sent.

Figure 4:
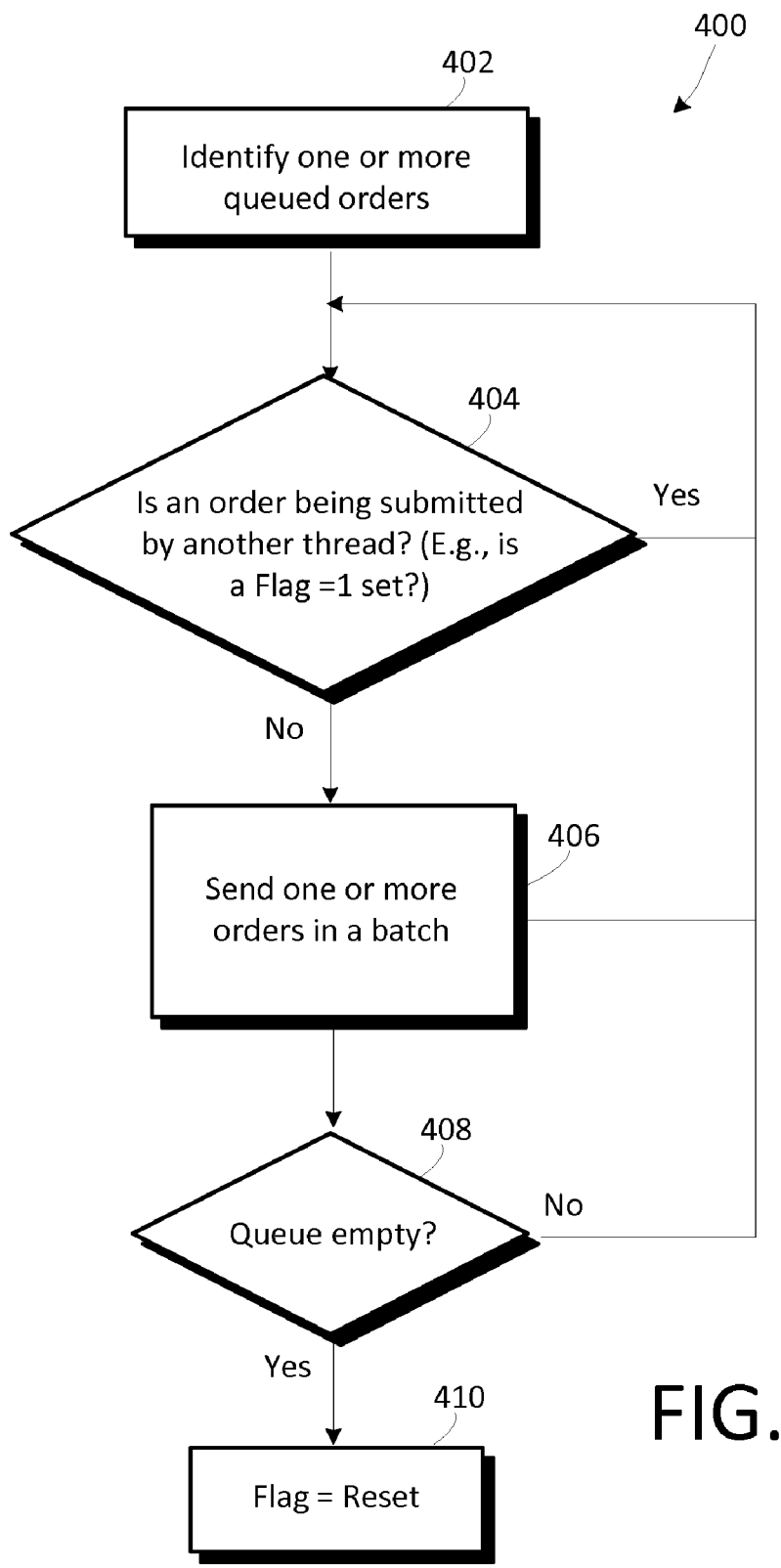
FIG. 4 illustrates a flowchart of a process for sending queued orders according to certain embodiments.

FIG. 4 illustrates a flowchart of a process for sending queued orders according to certain embodiments.

At block 402, a queued order is identified. Looking to FIG. 2, two queued orders are ultimately identified. In addition, as discussed above, the system may be configured to recognize that at least one order is queued when the second flag bit is set to "2."

At block 404, it is determined whether a thread is in the process of sending an order. Alternatively, it is determined whether the first flag bit set to "1." If it is, then the queuing thread will check again.

At block 406, if it is determined that a thread is not in the process of sending an order (e.g., the first flag bit is "0" or reset), then one or more orders may be sent in a batch to the electronic exchange. According to FIG. 2, the queuing thread initiates the process to send orders 202 and 204 at 216, which is a time equal to or shortly after 212.

At block 408, it is determined whether the queue is empty. If the queue is not empty, then the system process goes back to block 406 until the second flag bit is reset (the queue is empty). Alternatively, if the queue is not empty, then the system process is configured to go back to block 404. By going to block 404, the system determines whether another order is in the process of being sent. For example, once the first batch leaves the order queue, it may be possible according to an alternative process for a different thread to initiate the sending process (especially an order having a designated level of importance). Consequently, according to the alternative embodiment the queuing thread process could not move to block 406 until the first flag bit is reset. Once the queue is empty, then the second flag bit can be reset per block 410.

One or more of the blocks of the flowcharts discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a computer or other processing device.

Certain embodiments may omit one or more of these steps and/or perform the steps in a different order than the order listed. For example, some steps may not be performed in certain embodiments. As a further example, certain steps may be performed in a different temporal order, including simultaneously, than listed above.

Additionally, as described above, various computing devices may be configured to implement various aspects described herein. For example, the SSA 106 may be configured to implement the embodiments described herein. Thus, for example, if a software trading application at SSA 106 generated a number of trade orders at substantially the same time, then the embodiments described herein may be utilized to provide intelligent trade order submission amongst those trade orders. In another example, the client device 202 may be configured to implement the embodiments described herein. Alternatively, a combination of the client device 202 and SSA 106 may be configured to jointly implement the embodiments described herein.

While the invention(s) has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method including:
   initiating sending by a computing device a first order message in a first thread;
   determining by the computing device a plurality of order messages are ready to be sent while the first order message is being sent, wherein the plurality of order messages are in one or more other threads, wherein the plurality of order messages does not include the first order message, wherein the one or more other threads do not include the first thread;
   queuing by the computing device the plurality of order messages in a queuing thread in response to determining the plurality of order messages are ready to be sent while the first order message is being sent;

completing sending by the computing device the first order message in the first thread; and initiating sending by the computing device at least two of the plurality of order messages in the queuing thread in response to completing sending the first order message.

2. The method of claim 1, further including generating by the computing device the first order message in the first thread.

3. The method of claim 1, further including initiating generating by the computing device at least one of the plurality of order messages prior to initiating sending the first order message.

4. The method of claim 1, further including initiating generating by the computing device at least one of the plurality of order messages after initiating sending the first order message.

5. The method of claim 1, further including receiving by the computing device the first order message from a client device.

6. The method of claim 1, further including receiving by the computing device at least one of the plurality of order messages from a client device.

7. The method of claim 1, wherein the plurality of order messages are sent in a batch.

8. The method of claim 1, wherein the computing device includes a client device.

9. The method of claim 1, wherein the computing device includes a server-side device.

10. A non-transitory computer readable medium having stored therein instructions executable by a processor, wherein the instructions are executable to:

initiate sending a first order message in a first thread;

determine a plurality of order messages are ready to be sent while the first order message is being sent, wherein the plurality of order messages are in one or more other threads, wherein the plurality of order messages does not include the first order message, wherein the one or more other threads do not include the first thread;

queue the plurality of order messages in a queuing thread in response to determining the plurality of order messages are ready to be sent while the first order message is being sent;

complete sending the first order message in the first thread; and initiate sending at least two of the plurality of order messages in the queuing thread in response to completing sending the first order message.

11. The computer readable medium of claim 10, wherein the instructions are further executable to generate the first order message in the first thread.

12. The computer readable medium of claim 10, wherein the instructions are further executable to initiate generating at least one of the plurality of order messages prior to initiating sending the first order message.

13. The computer readable medium of claim 10, wherein the instructions are further executable to initiate generating at least one of the plurality of order messages after initiating sending the first order message.

14. The computer readable medium of claim 10, wherein the instructions are further executable to receive the first order message from a client device.

15. The computer readable medium of claim 10, wherein the instructions are further executable to receive at least one of the plurality of order messages from a client device.

16. The computer readable medium of claim 10, wherein the plurality of order messages are sent in a batch.

17. The computer readable medium of claim 10, wherein a client device includes the processor.

18. The computer readable medium of claim 10, wherein a server-side device includes the processor.

* * * * *